(12) United States Patent  (10) Patent No.: US 12,112,495 B2
Kang  (45) Date of Patent: Oct. 8, 2024

(54) DEPTH DATA FILTERING METHOD AND APPARATUS, ELECTRONIC DEVICE, AND READABLE STORAGE MEDIUM

(71) Applicant: GUANGDONG OPPO MOBILE TELECOMMUNICATIONS CORP., LTD., Dongguan (CN)

(72) Inventor: Jian Kang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 452 days.

(21) Appl. No.: 17/559,103

(22) Filed: Dec. 22, 2021

(65) Prior Publication Data

US 2022/0114744 A1  Apr. 14, 2022

Related U.S. Application Data

(63) Continuation of application No. PCT/CN2020/097464, filed on Jun. 22, 2020.

(30) Foreign Application Priority Data

Jul. 11, 2019  (CN) .................. 201910626650.X (51) Int. Cl.
  *G06K 9/00*  (2022.01)
  *G01B 11/22*  (2006.01)
  (Continued)

(52) U.S. Cl.
  CPC ................ *G06T 7/55* (2017.01); *G01B 11/22* (2013.01); *G01S 7/4865* (2013.01);
  (Continued)

(58) Field of Classification Search
  CPC ... G06T 7/55; G06T 5/70; G06T 2207/10016; G06T 2207/10028; G01S 17/894;
  (Continued)

(56) References Cited

U.S. PATENT DOCUMENTS

2012/0134598 A1  5/2012  Ovsiannikov et al.
2012/0274634 A1  11/2012  Yamada et al.
(Continued)

FOREIGN PATENT DOCUMENTS

CN  102663712 A  9/2012
CN  103413276 A  11/2013
(Continued)

OTHER PUBLICATIONS

Lin, Bor-Shing, et al. "Temporal and spatial denoising of depth maps." Sensors 15.8 (2015): 18506-18525. (Year: 2015).*
(Continued)

*Primary Examiner* — Avinash Yentrapati
(74) *Attorney, Agent, or Firm* — Sheppard, Mullin, Richter & Hampton LLP (57) ABSTRACT

Provided are a depth data filtering method and apparatus, an electronic device, and a readable storage medium. The method includes: obtaining, for each pixel, a depth difference value between two consecutive frames of depth maps; marking an area formed by pixels as a first environment change area, the depth difference value of the pixels is smaller than a predetermined absolute depth deviation; marking an area formed by pixels as a second environment change area, the depth difference value of the pixels is greater than or equal to the predetermined absolute depth deviation; respectively filtering the first environment change area and the second environment change area.

20 Claims, 6 Drawing Sheets

(51) Int. Cl.
*G01S 7/4865* (2020.01)
*G01S 17/894* (2020.01)
*G06T 5/70* (2024.01)
*G06T 7/55* (2017.01)
*G06V 10/22* (2022.01)
*G06V 10/30* (2022.01)
*G06V 10/34* (2022.01)
*G06V 10/72* (2022.01)
*G06V 10/74* (2022.01)

(52) U.S. Cl.
CPC ............ *G01S 17/894* (2020.01); *G06T 5/70* (2024.01); *G06V 10/225* (2022.01); *G06V 10/30* (2022.01); *G06V 10/34* (2022.01); *G06V 10/72* (2022.01); *G06V 10/761* (2022.01); *G06T 2207/10016* (2013.01); *G06T 2207/10028* (2013.01)

(58) Field of Classification Search
CPC .... G01S 7/4865; G06V 10/761; G06V 10/30; G06V 10/72; G06V 10/225; G06V 10/34; G01B 11/22
See application file for complete search history.

(56) References Cited

U.S. PATENT DOCUMENTS

| | | | |
|---|---|---|---|
| 2013/0242043 A1* | 9/2013 | Yang | ........................ G06T 5/20 348/42 |
| 2015/0339806 A1 | 11/2015 | Wu et al. | |
| 2016/0063715 A1 | 3/2016 | Wan | |
| 2018/0293745 A1* | 10/2018 | Ha | ............................ G06T 7/12 |
| 2019/0132495 A1* | 5/2019 | Ouyang | ............... H04N 23/951 |

FOREIGN PATENT DOCUMENTS

| | | | |
|---|---|---|---|
| CN | 104240179 | A | 12/2014 |
| CN | 104394399 | A | 3/2015 |
| CN | 104683783 | A | 6/2015 |
| CN | 105139401 | A | 12/2015 |
| CN | 105899969 | A | 8/2016 |
| CN | 107743638 | A | 2/2018 |
| CN | 107958446 | A1 | 4/2018 |
| CN | 109191506 | A | 1/2019 |
| CN | 109636748 | A | 4/2019 |
| CN | 109712192 | A | 5/2019 |
| CN | 110400273 | A | 11/2019 |
| EP | 3385903 | A1 | 10/2018 |

OTHER PUBLICATIONS

Extended European Search Report dated Jul. 15, 2022 received in European Patent Application No. EP20837151.8.
Lin et al:"Temporal and Spatial Denoising of Depth Maps", Sensors, vol. 15, No. 8, Jul. 29, 2015 (Jul. 29, 2015), pp. 18506-18525, XP055904327.
First Office Action from corresponding Chinese Application No. 201910626650.X, dated Apr. 25, 2021. English translation is attached.
International Search Report and Written Opinion dated Sep. 25, 2020 in International Application No. PCT/CN2020/097464. English translation is attached.
Communication pursuant to Article 94(3) EPC dated Jun. 26, 2024 received in European Patent Application No. EP 20837151.8.

* cited by examiner

DEPTH DATA FILTERING METHOD AND APPARATUS, ELECTRONIC DEVICE, AND READABLE STORAGE MEDIUM

CROSS-REFERENCE TO RELATED APPLICATIONS

This application is a continuation of International Application No. PCT/CN2020/097464, filed on Jun. 22, 2020, which claims priority and rights of the Patent Application No. 201910626650.X, filed to the China National Intellectual Property Administration on Jul. 11, 2019. The disclosures of the aforementioned applications are incorporated herein by reference in their entireties.

FIELD

The present disclosure relates to communication technology field, and more particularly, to a depth data filtering method and apparatus, an electronic device, and a readable storage medium.

BACKGROUND

Normally, a Time of Flight (ToF) sensor determines a distance between the sensor and an object by calculating a ToF of a pulse signal. A variety of errors may occur due to various kinds of uncertainties existed in a measurement process, and a depth measurement error of the ToF in a measurement range of about 1% may be caused by these errors with great randomness.

In an actual system, although the above measurement error may be tolerable, it is still desired that the sensor can reach a temporal consistency in a limited period.

SUMMARY

An embodiment of the present disclosure provides a depth data filtering method and apparatus, an electronic device, and a readable storage medium.

In a first aspect, embodiments of the present disclosure provide a depth data filtering method. The method includes: obtaining, for each pixel, a depth difference value between two consecutive frames of depth maps; marking an area formed by pixels as a first environment change area, the depth difference value of the pixels being smaller than a predetermined absolute depth deviation; marking an area formed by pixels as a second environment change area, the depth difference value of pixels being greater than or equal to the predetermined absolute; generating a first similarity weight corresponding to each pixel in the first environment change area based on the depth difference value, an enlarged predetermined original smoothing coefficient, and a pixel depth deviation value of a current frame; generating a second similarity weight corresponding to each pixel in the second environment change area based on the depth difference value, a reduced predetermined original smoothing coefficient, and the pixel depth deviation value of the current frame; and filtering the first environment change area based on the first similarity weight and filtering the second environment change area based on the second similarity weight.

In a second aspect, the embodiments of the present disclosure provide a depth data filtering apparatus. The apparatus includes: an obtaining module configured to obtain, for each pixel, a depth difference value between two consecutive frames of depth maps; a first marking module configured to mark an area formed by pixels as a first environment change area, the depth difference value of pixels being smaller than a predetermined absolute depth deviation; a second marking module configured to mark an area formed by pixels as a second environment change area, the depth difference value of the pixels being greater than or equal to the predetermined absolute depth deviation; a first generating module configured to generate a first similarity weight corresponding to each pixel in the first environment change area based on the depth difference value, an enlarged predetermined original smoothing coefficient, and a pixel depth deviation value of a current frame; a second generating module configured to generate a second similarity weight corresponding to each pixel in the second environment change area based on the depth difference value, a reduced predetermined original smoothing coefficient, and the pixel depth deviation value of the current frame; and a processing module configured to perform filter processing for the first environment change area based on the first similarity weight and perform filter processing for the second environment change area based on the second similarity weight.

In a third aspect, the embodiments of the present disclosure provide an electronic device. The electronic device includes an image sensor, a memory, a processor, and a computer program stored in the memory and executable on the processor. The image sensor is electrically connected to the processor. The program, when executed by the processor, implements the depth data filtering method as described in the above embodiments.

In a fourth aspect, the embodiments of the present disclosure provide a non-transitory computer-readable storage medium, including a computer program stored thereon. The computer program, when executed by a processor, implements the depth data filtering method as described in the above embodiments.

The additional aspects and advantages of the present disclosure will be partly given in the following description, partly be apparent in the following description or be appreciated through the practice of the present disclosure.

BRIEF DESCRIPTION OF DRAWINGS

The above and/or additional aspects and advantages of the present disclosure will be apparent and easy to be understood in combination with the following description of the embodiments with reference to drawings.

DESCRIPTION OF EMBODIMENTS

The embodiments of the present disclosure are described in detail below. The examples of the embodiments are illustrated in the drawings, throughout which the same or similar reference numeral represents the same or similar element or element having the same or similar function. The following embodiments described with reference to the drawings are exemplary and intended to explain the present disclosure, but should not be interpreted as a limitation of the present disclosure.

Figure 2:
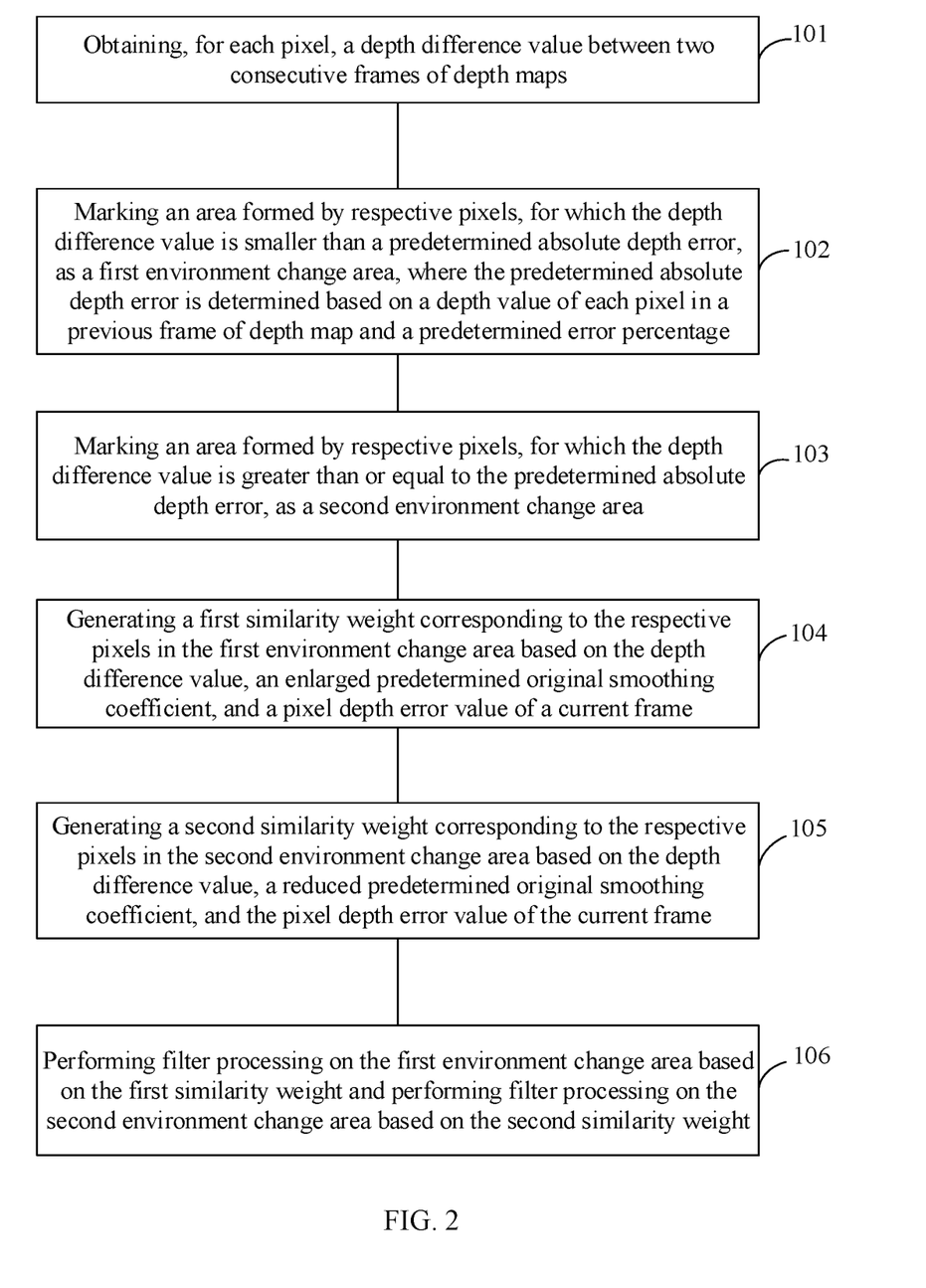
FIG. 2 is a schematic flow chart of a depth data filtering method provided in an embodiment of the present disclosure.

FIG. 2 is a schematic flow chart of a depth data filtering method provided by an embodiment of the present disclosure. As illustrated in FIG. 2, the method includes the following actions at blocks.

In block 101, for each pixel, a depth difference value between two consecutive frames of depth maps is obtained.

In block 102, an area formed by pixels, for which the depth difference value is smaller than a predetermined absolute depth deviation. The predetermined absolute depth deviation is determined based on a depth value of each pixel in a previous frame of depth map and a predetermined error percentage.

In block 103, an area formed by respective pixels, for which the depth difference value is greater than or equal to the predetermined absolute depth deviation is marked as a second environment change area.

In block 104, a first similarity weight corresponding to each pixel in the first environment change area is generated based on the depth difference value, an enlarged predetermined original smoothing coefficient, and a pixel depth deviation value of a current frame.

In block 105, a second similarity weight corresponding to each pixel in the second environment change area is generated based on the depth difference value, a reduced predetermined original smoothing coefficient, and the pixel depth deviation value of the current frame.

In block 106, filter processing for the first environment change area is performed based on the first similarity weight and filter processing for the second environment change area is performed based on the second similarity weight.

As a possible implementation, obtained are a first original depth value of the previous frame and a first original depth value of the current frame corresponding to each pixel in the first environment change area in a predetermined coordinate system; and a first current frame depth value corresponding to each pixel in the first environment change area is obtained by summing-up a product of the first similarity weight and the first original depth value of the previous frame and a product of a third similarity weight and the first original depth value of the current frame, where a sum of the first similarity weight and the third similarity weight is equal to 1.

As a possible implementation, obtained are a second original depth value of the previous frame and a second original depth value of the current frame corresponding to each pixel in the second environment change area in a predetermined coordinate system, and a second current frame depth value corresponding to each pixel in the second environment change area is obtained by summing-up a product of the second similarity weight and the second original depth value of the previous frame and a product of a fourth similarity weight and the second original depth value of the current frame, where a sum of the second similarity weight and the fourth similarity weight is equal to 1.

Figure 4:
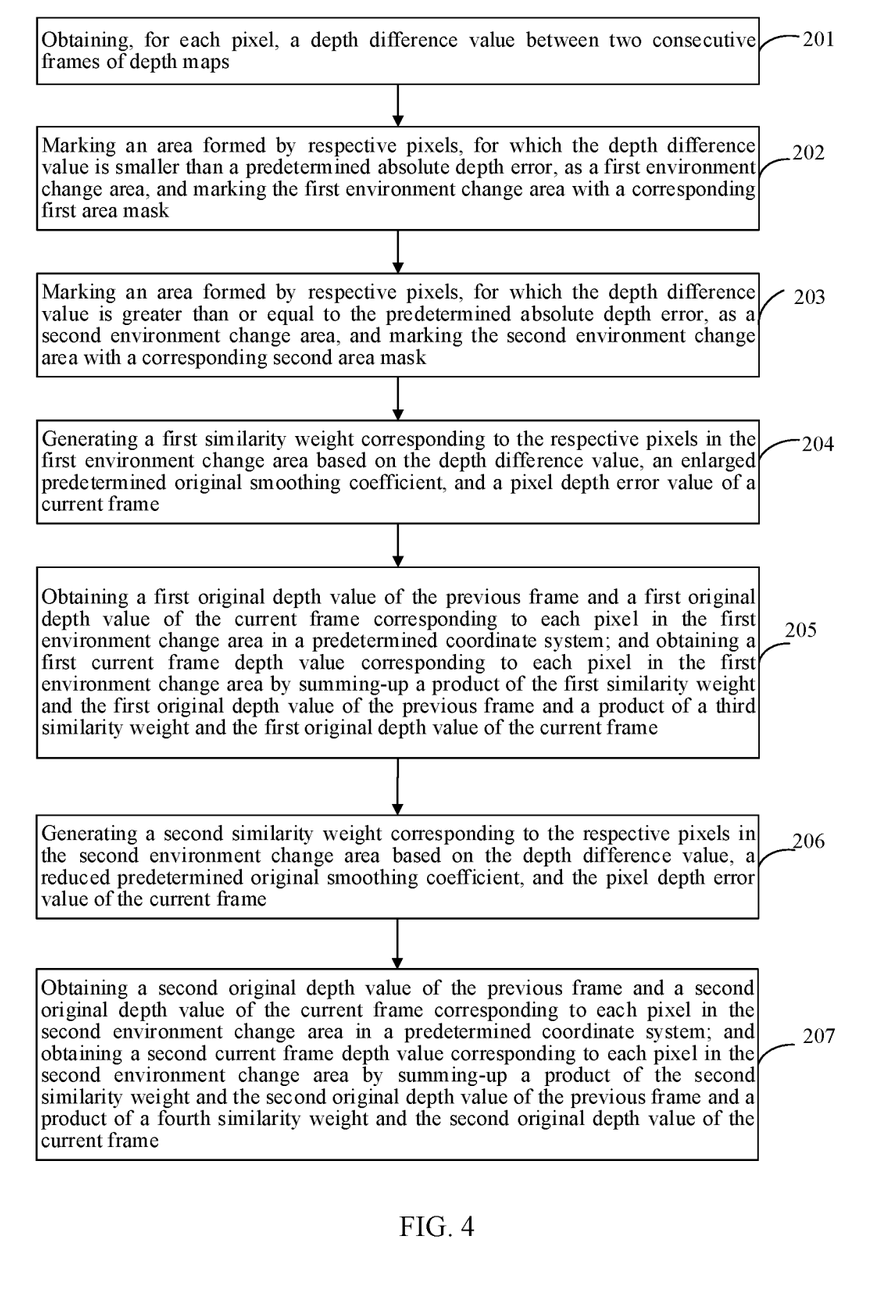
FIG. 4 is a schematic flow chart of another depth data filtering method provided in an embodiment of the present disclosure.

FIG. 4 is schematic flow chart of another depth data filtering method provided in an embodiment of the present disclosure. As illustrated in FIG. 4, the method includes the following actions at blocks.

In block 201, for each pixel, a depth difference value between two consecutive frames of depth maps is obtained.

In block 202, an area formed by pixels, for which the depth difference value is smaller than a predetermined absolute depth deviation is marked as a first environment change area, and the first environment change area is marked with a first area mask.

In block 203, an area formed by respective pixels, for which the depth difference value is greater than or equal to the predetermined absolute depth deviation is marked as a second environment change area, and the second environment change area is marked with a second area mask.

In block 204, a first similarity weight corresponding to each pixel in the first environment change area is generated based on the depth difference value, an enlarged predetermined original smoothing coefficient, and a pixel depth deviation value of a current frame.

In block 205, obtained are a first original depth value of the previous frame and a first original depth value of the current frame corresponding to each pixel in the first environment change area in a predetermined coordinate system, and a first current frame depth value corresponding to each pixel in the first environment change area is obtained by summing-up a product of the first similarity weight and the first original depth value of the previous frame and a product of a third similarity weight and the first original depth value of the current frame, where sum of the first similarity weight and the third similarity weight is equal to 1.

In block 206, a second similarity weight corresponding to each pixel in the second environment change area is generated based on the depth difference value, a reduced predetermined original smoothing coefficient, and the pixel depth deviation value of the current frame.

In block 207, obtained are a second original depth value of the previous frame and a second original depth value of the current frame corresponding to each pixel in the second environment change area in a predetermined coordinate system, and a second current frame depth value corresponding to each pixel in the second environment change area is obtained by summing-up a product of the second similarity weight and the second original depth value of the previous frame and a product of a fourth similarity weight and the second original depth value of the current frame.

The predetermined coordinate system is Cartesian coordinate system. For a pixel, a depth value of the current frame of depth map=a depth of the previous frame of depth map*w1+an original depth of the current frame of depth map*w2.

The formula for w1 is $$w1 = s * \exp\left(-\frac{\mathit{diff}^2}{2\sigma^2}\right),$$

where s represents the predetermined original smoothing coefficient, diff represents the depth difference value, indicating a reflectivity difference between the previous frame and the current frame for the pixel, and σ represents the pixel depth deviation value of the current frame.

Figure 5:
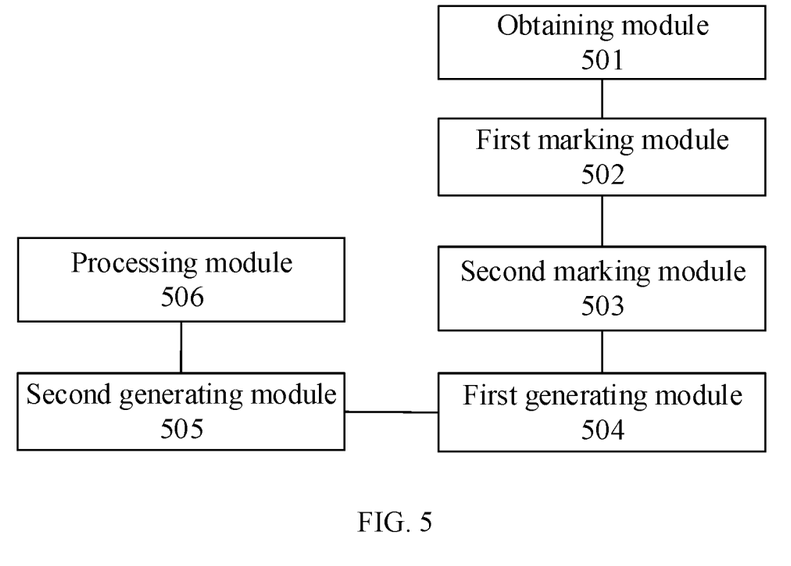
FIG. 5 is a schematic structural diagram of a depth data filtering apparatus according to an embodiment of the present disclosure.

To implement the above embodiments, the present disclosure further provides a depth data filtering apparatus. As illustrated in FIG. 5, the depth data filtering apparatus includes an obtaining module 501, a first marking module 502, a second marking module 503, a first generating module 504, a second generating module 505, and a processing module 506.

The obtaining module 501 is configured to obtain, for each pixel, a depth difference value between two consecutive frames of depth maps.

The first marking module 502 is configured to mark an area formed by respective pixels, for which the depth difference value is smaller than a predetermined absolute depth deviation, as a first environment change area, where the predetermined absolute depth deviation is determined based on a depth value of each pixel in a previous frame of depth map and a predetermined error percentage.

The second marking module 503 is configured to mark an area formed by respective pixels, for which the depth difference value is greater than or equal to the predetermined absolute depth deviation, as a second environment change area.

The first generating module 504 is configured to generate a first similarity weight corresponding to each pixel in the first environment change area based on the depth difference value, an enlarged predetermined original smoothing coefficient, and a pixel depth deviation value of a current frame.

The second generating module 505 is configured to generate a second similarity weight corresponding to each pixel in the second environment change area based on the depth difference value, a reduced predetermined original smoothing coefficient, and the pixel depth deviation value of the current frame.

The processing module 506 is configured to perform filter processing for the first environment change area based on the first similarity weight and perform filter processing for the second environment change area based on the second similarity weight.

In an embodiment of the present disclosure, a similarity weight is generated based on the depth difference value for each pixel, a predetermined original smoothing coefficient, and the pixel depth deviation value of the current frame by applying a predetermined formula.

In an embodiment of the present disclosure, the predetermined formula is $$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

To implement the above embodiments, the present disclosure further provides an electronic device. The electronic device includes an image sensor, a memory, a processor, and a computer program stored in the memory and executable on the processor. When the program is executed by the processor, the program implements a depth data filtering method.

To implement the above embodiments, the embodiments of the present disclosure further provide a non-transitory computer-readable storage medium, including a computer program stored thereon. The computer program, when executed by a processor, implements the depth data filtering method as described in the above method embodiments.

Figure 1:
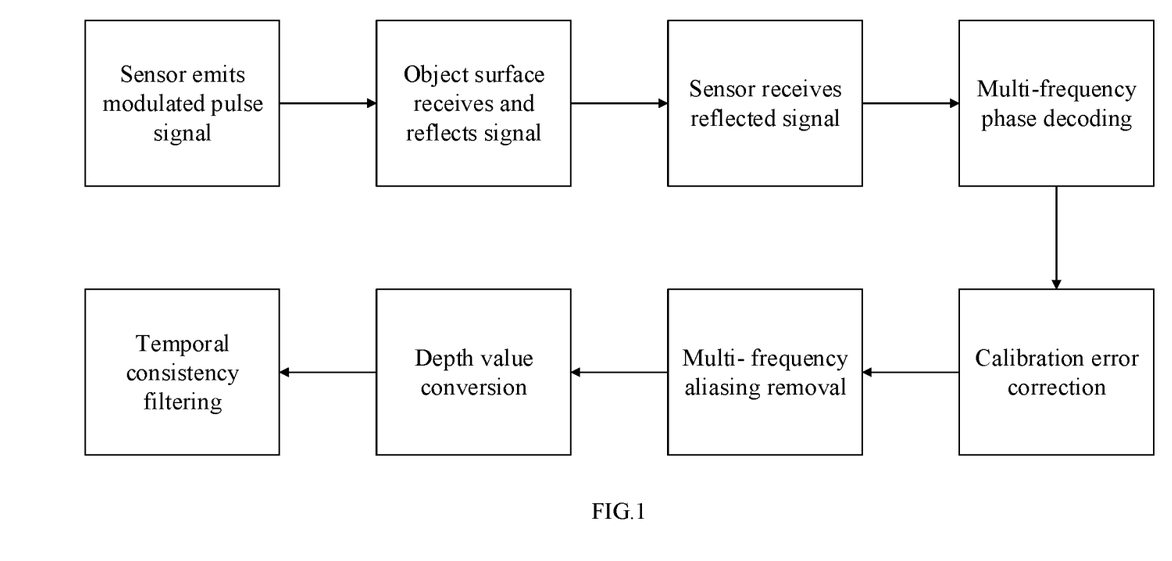
FIG. 1 is a schematic flow chart of a depth obtaining method provided in an embodiment of the present disclosure.

In an embodiment, the image sensor is a ToF sensor. Specifically, the ToF sensor determines a distance between the sensor and an object by calculating a ToF of a pulse signal. For instance, $$d = \frac{c}{2}t,$$

where d represents a depth, c represents a velocity of light, and t represents the ToF. The reason of dividing 2 is in that the pulse signal flies twice between the sensor and the object. Based on the description of the background, it can be appreciated that a temporal consistency filtering for ToF depth data is important. A depth of each frame of map for ToF is obtain in the manner as illustrated in FIG. 1. The ToF sensor sends a modulated pulse signal. A surface of an object to be measured receives and reflects the pulse signal. Then the ToF sensor receives a reflected signal and decodes a multi-frequency phase diagram. Then an error correction is performed on ToF data based on a calibration parameter. Then an aliasing of a multi-frequency signal is removed, a depth value is transformed from a radial coordinate system to a Cartesian coordinate system, and finally, the temporal consistency filtering is performed for the depth value and a relatively smoothing depth result in a time dimension is output.

However, the above solution is to filter all pixels in the full frame, which may result in insufficient smoothness of the temporal consistency filtering and cause a technical problem of great jitter for depth data in a time domain. By dividing the depth map into two environment change areas and choosing different strategies to perform smoothing processing in the different areas, the depth value of a depth smoothly changing area becomes effectively smoother in the time dimension and a depth rapidly changing area maintains the original high dynamics, as specifically described below.

A depth data filtering method and apparatus, an electronic device, and a readable storage medium according to the following embodiments of the present disclosure are described with reference to drawings.

FIG. 2 is a schematic flow chart of a depth data filtering method provided in an embodiment of the present disclosure. As illustrated in FIG. 2, the method includes the following actions at blocks.

In block 101, for each pixel, a depth difference value between two consecutive frames of depth maps is obtained.

In block 102, an area formed by respective pixels, for which the depth difference value is smaller than a predetermined absolute depth deviation is marked as a first environment change area. The predetermined absolute depth deviation is determined based on a depth value of each pixel in a previous frame of depth map, and a predetermined error percentage.

In block 103, an area formed by respective pixels, for which the depth difference value is greater than or equal to the predetermined absolute depth deviation is marked as a second environment change area.

Specifically, for each pixel, the depth difference value between two consecutive frames of depth maps, for example, between a current frame of depth map and a previous frame of depth map, is obtained, and the depth difference value is compared with a predetermined absolute depth deviation to determine whether the pixel should be marked as the first environment change area or the second environment change area, i.e., the environment smoothly changing area or the environment rapidly changing area. The predetermined absolute depth deviation is determined based on the depth value of each pixel in the previous frame of depth map and the predetermined error percentage.

The predetermined absolute depth deviation may be selected as required. For example, for on pixel, the depth values of the previous frame and the current frame are [500, 502], respectively, and the predetermined error percentage is one percent of the depth value of 500, i.e., equal to 5; that is, the depth difference value for the pixel between the current frame of depth map and the previous frame of depth map is equal to 2, which is smaller than 5, and thus the pixel is correspondingly marked as the first environment change area. For example, for one pixel, the depth values of the previous frame and the current frame are [500, 520], respectively, and the predetermined error percentage is one percent of the depth value of 500, i.e., equal to 5; that is, the depth difference value for the pixel between the current frame of depth map and the previous frame of depth map is equal to 20, which is greater than 5, and thus the pixel is marked as the second environment change area, correspondingly.

Therefore, according to the above method, the area formed by respective pixels, for which the depth difference value is smaller than the predetermined absolute depth deviation is marked as the first environment change area, and the area formed by respective pixels, for which the depth difference value is greater than or equal to the predetermined absolute depth deviation is marked as the second environment change area.

In block 104, a first similarity weight corresponding to each pixel in the first environment change area is generated based on the depth difference value, an enlarged predetermined original smoothing coefficient, and a pixel depth deviation value of a current frame.

In block 105, a second similarity weight corresponding to each pixel in the second environment change area is generated based on the depth difference value, a reduced predetermined original smoothing coefficient, and the pixel depth deviation value of the current frame.

In block 106, filter processing for the first environment change area is performed based on the first similarity weight, and filter processing for the second environment change area is performed based on the second similarity weight.

Therefore, after determining the first environment change area and the second environment change area, a smoothing processing is required to be performed for the respective areas. A first similarity weight corresponding to each pixel in the first environment change area is generated based on the depth difference value for each pixel, the enlarged predetermined original smoothing coefficient, and the pixel depth deviation value of the current frame, and the second similarity weight corresponding to each pixel in the second environment change area is generated based on the depth difference value for each pixel, the reduced predetermined original smoothing coefficient, and the pixel depth deviation value of the current frame.

A similarity weight may be generated based on the depth difference value for each pixel, a predetermined original smoothing coefficient, and the pixel depth deviation value of the current frame by applying a predetermined formula. For example, the predetermined formula is $$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

Therefore, the first environment change area, i.e., the environment smoothly changing area, has relatively high smoothness, i.e., relatively high credibility. The predetermined original smoothing coefficient needs to be enlarged to increase the first similarity weight.

Further, the first similarity weight corresponding to each pixel in the first environment change area may be generated based on the depth difference value for each pixel, the enlarged predetermined original smoothing coefficient, and the pixel depth deviation value of the current frame in accordance with the above formula.

Likewise, the second environment change area, i.e., the environment rapidly changing area, has relatively low smoothness, i.e., relatively low credibility. The predetermined original smoothing coefficient needs to be reduced to decrease the first similarity weight.

Further, the second similarity weight corresponding to each pixel in the second environment change area may be generated based on the depth difference value for each pixel, the reduced predetermined original smoothing coefficient, and the pixel depth deviation value of the current frame in accordance with the above formula.

Finally, the filter processing for the first environment change area is performed based on the first similarity weight, and the filter processing for the second environment change area is performed based on the second similarity weight.

Figure 3:
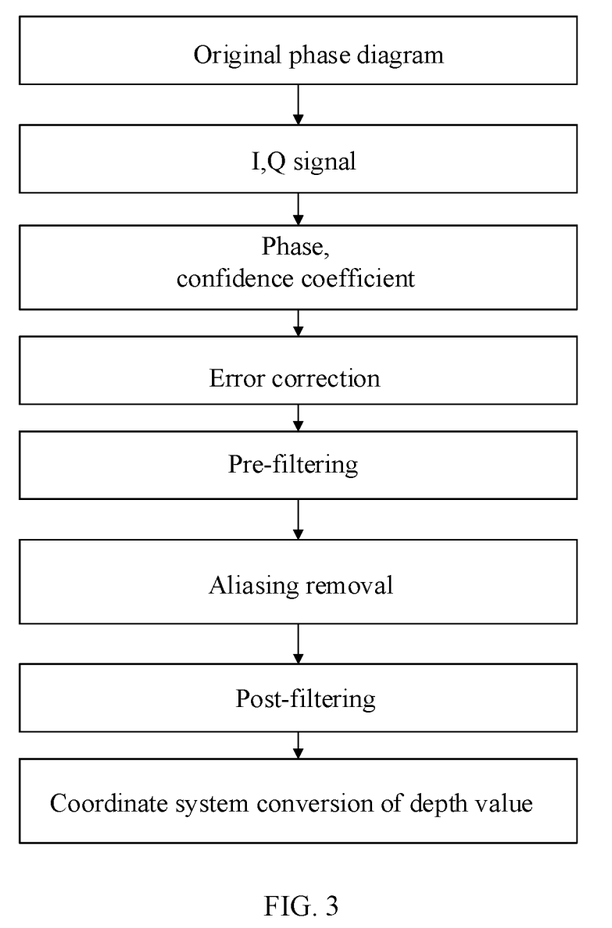
FIG. 3 is a schematic diagram of obtaining an original depth value provided in an embodiment of the present disclosure.

Specifically, the depth value corresponding to each pixel in the current frame of depth map is first obtained. Specifically, as illustrated in FIG. 3, a ToF sensor captures an original phase diagram, which is 4-phase diagram in a single frequency mode and is 8-phase diagram in a dual frequency mode. Then, IQ (phase cosine-phase sine) signal of each pixel is calculated from the original phase diagram, and a phase and a confidence coefficient of each pixel are calculated based on the IQ signal, where the confidence coefficient represents a reliability of a phase value of the pixel, reflecting an energy magnitude of the pixel.

Further, several types of errors, including circular error, temperature error, gradient error, parallactic error, etc., are corrected online based on internal reference calibrated offline for ToF, a pre-filtering is performed prior to the dual frequency aliasing removal to filter noises in respective frequency modes, and the dual frequency aliasing removal is performed to determine the real number of cycles for each pixel. Finally, post-filtering is performed for the result of antialiasing. The depth value is transformed from a radial coordinate system to a Cartesian coordinate system. That is, the above predetermined coordinate system is preferably the Cartesian coordinate system.

There are many ways to perform the filter processing for the first environment change area based on the first similarity weight. For example, the processing is performed directly based on the first similarity weight and a depth value corresponding to a pixel in an adjacent frame of depth map; or a third similarity is determined and the processing is performed by combining the first similarity weight, the third similarity weight, and the depth value corresponding to the pixel in the adjacent frame of depth map, which can be chosen according to actual application needs.

As a possible implementation, obtained are a first original depth value of the previous frame and a first original depth value of the current frame corresponding to each pixel in the first environment change area in a predetermined coordinate system, and a first current frame depth value corresponding to each pixel in the first environment change area is obtained by summing-up a product of the first similarity weight and the first original depth value of the previous frame and a product of a third similarity weight and the first original depth value of the current frame, where a sum of the first similarity weight and the third similarity weight is equal to 1.

It should be noted that the predetermined original smoothing coefficient is an original empirical value set based on the temporal consistency filtering.

There are many ways to perform the filter processing for the second environment change area based on a second similarity weight. For example, the processing is performed directly based on the second similarity weight and a depth value corresponding to a pixel in an adjacent frame of depth map; or a fourth similarity is determined and the processing is performed by combining the second similarity weight, the fourth similarity weight, and the depth value corresponding to the pixel in the adjacent frame of depth map, which can be chosen according to actual application needs.

As a possible implementation, obtained are a second original depth value of the previous frame and a second original depth value of the current frame corresponding to each pixel in the second environment change area in a predetermined coordinate system, and a second current frame depth value corresponding to each pixel in the second environment change area is obtained by summing-up a product of the second similarity weight and the second original depth value of the previous frame and a product of a fourth similarity weight and the second original depth value of the current frame, where a sum of the second similarity weight and the fourth similarity weight is equal to 1.

To sum up, in the depth data filtering method according to the embodiments of the present disclosure, for each pixel, the depth difference value between two consecutive frames of depth maps is obtained; the area formed by respective pixels, for which the depth difference value is smaller than the predetermined absolute depth deviation is marked as the first environment change area, where the predetermined absolute depth deviation is determined based on the depth value of each pixel in a previous frame of depth map and the predetermined error percentage; the area formed by respective pixels, for which the depth difference value is greater than or equal to the predetermined absolute depth deviation is marked as the second environment change area; the first similarity weight corresponding to each pixel in the first environment change area is generated based on the depth difference value, the enlarged predetermined original smoothing coefficient, and the pixel depth deviation value of a current frame; the second similarity weight corresponding to each pixel in the second environment change area is generated based on the depth difference value, the reduced predetermined original smoothing coefficient, and the pixel depth deviation value of the current frame; and the filter processing for the first environment change area is performed based on the first similarity weight, and the filter processing for the second environment change area is performed based on the second similarity weight. In this way, the technical problems in the related art, which may result in the insufficient smoothness of the temporal consistency filtering and the great jitter of depth data in a time domain, are solved effectively. By dividing the depth map into two environment change areas and choosing different strategies to perform the smoothing processing in the different areas, the depth value of the depth smoothly changing area in the time dimension becomes effectively smoother and the depth rapidly changing area maintains the original high dynamics.

FIG. 4 is a schematic flow chart of another depth data filtering method provided in an embodiment of the present disclosure. As illustrated in FIG. 4, the method includes the following actions at blocks.

In block 201, for each pixel, a depth difference value between two consecutive frames of depth maps is obtained.

In block 202, an area formed by respective pixels, for which the depth difference value is smaller than a predetermined absolute depth deviation is marked as a first environment change area, and the first environment change area is marked with a first area mask.

In block 203, an area formed by respective pixels, for which the depth difference value is greater than or equal to the predetermined absolute depth deviation is marked as a second environment change area, and the second environment change area is marked with a second area mask.

Specifically, for each pixel, the depth difference value between two consecutive frames of depth maps, for example, between a current frame of depth map and a previous frame of depth map, is obtained, and the depth difference value is compared with the predetermined absolute depth deviation to determine whether the pixel should be marked as the first environment change area or the second environment change area, i.e., an environment smoothly changing area or an environment rapidly changing area.

The predetermined absolute depth deviation may be selected as required. For example, for one pixel, the depth values of the previous frame and the current frame are [500, 502], respectively, and the predetermined error percentage is one percent of the depth value of 500, i.e., equal to 5; the depth difference value for the pixel between the current frame of depth map and the previous frame of depth map is equal to 2, which is smaller than 5, and thus the pixel is marked as the first environment change area, correspondingly. For example, for one pixel, the depth values of the previous frame and the succeeding frame are [500, 520], respectively, and the predetermined error percentage is one percent of the depth value of 500, i.e., equal to 5; the depth difference value for the pixel between the current frame of depth map and the previous frame of depth map is equal to 20, which is greater than 5, and thus pixel is marked as the second environment change area, correspondingly.

Therefore, according to the above method, the area formed by respective pixels, for which the depth difference value is smaller than the predetermined absolute depth deviation is marked as the first environment change area, where the first environment change area is marked with the first area mask to facilitate quick recognition of the corresponding area based on the area mask when performing the smoothing processing subsequently. The area formed by respective pixels, for which the depth difference value is greater than or equal to the predetermined absolute depth deviation is marked as the second environment change area, where the second environment is marked with the second area mask to facilitate quick recognition of the corresponding area based on the area mask when performing the smoothing processing subsequently.

In block 204, a first similarity weight corresponding to each pixel in the first environment change area is generated based on the depth difference value, an enlarged predetermined original smoothing coefficient, and a pixel depth deviation value of a current frame.

In block 205, obtained are a first original depth value of the previous frame and a first original depth value of the current frame corresponding to each pixel in the first environment change area in a predetermined coordinate system, and a first current frame depth value corresponding to each pixel in the first environment change area is obtained by summing-up a product of the first similarity weight and the first original depth value of the previous frame and a product of a third similarity weight and the first original depth value of the current frame.

In block 206, a second similarity weight corresponding to each pixel in the second environment change area is generated based on the depth difference value, a reduced predetermined original smoothing coefficient, and the pixel depth deviation value of the current frame.

In block 207, obtained are a second original depth value of the previous frame and a second original depth value of the current frame corresponding to each pixel in the second environment change area in a predetermined coordinate system, and a second current frame depth value corresponding to each pixel in the second environment change area is obtained by summing-up a product of the second similarity weight and the second original depth value of the previous frame and a product of a fourth similarity weight and the second original depth value of the current frame.

The predetermined coordinate system is Cartesian coordinate system. For one pixel, a depth value of the current frame of depth map=a depth of the previous frame of depth map*w1+an original depth of the current frame of depth map*w2.

The formula for w1 is $$w1 = s * \exp\left(-\frac{diff^2}{2\sigma^2}\right),$$

where s represents the predetermined original smoothing coefficient. The first environment change area, i.e., the environment smoothly changing area, has relatively high smoothness, i.e., relatively high credibility, this pixel belongs to the environment smoothing changing area, and the predetermined original smoothing coefficient is enlarged to generate the first similarity weight.

In addition, the second environment change area, i.e., the environment rapidly changing area, has relatively low smoothness, i.e., relatively low credibility, this pixel belongs to the environment rapidly changing area, and the predetermined original smoothing coefficient is reduced to generate the second similarity weight. diff represents the depth difference value indicating a reflectivity difference between the previous frame and the current frame for the pixel.

It should be noted that σ represents the pixel depth deviation value of the current frame, σ=dep*1%, where dep represents an original depth of the current frame of depth map. If a distribution of the depth value between two frames satisfies a normal distribution, it is considered that the noise in the time domain is relatively small, that is, σ of the normal distribution is very small, i.e., it has relatively high smoothness. Otherwise, it has relatively low smoothness.

Therefore, the detected depth temporal consistency filtering based on depth change area focuses on preprocessing of the depth map in the time dimension, which provides a smoother and more stable depth data in the time dimension for subsequent applications related to ToF depth map, such as gesture recognition, three-dimensional modeling, somatosensory games, etc., and achieves better application experience.

To sum up, in the depth data filtering method according to the embodiments of the present disclosure, for each pixel, the depth difference value between two consecutive frames of depth maps is obtained; the area formed by respective pixels, for which the depth difference value is smaller than the predetermined absolute depth deviation is marked as the first environment change area, where the predetermined absolute depth deviation is determined based on the depth value of each pixel in a previous frame of depth map and the predetermined error percentage; the area formed by respective pixels, for which the depth difference value is greater than or equal to the predetermined absolute depth deviation is marked as the second environment change area; the first similarity weight corresponding to each pixel in the first environment change area is generated based on the depth difference value, the enlarged predetermined original smoothing coefficient, and the pixel depth deviation value of a current frame; the second similarity weight corresponding to each pixel in the second environment change area is generated based on the depth difference value, the reduced predetermined original smoothing coefficient, and the pixel depth deviation value of the current frame; and the filter processing for the first environment change area is performed based on the first similarity weight, and the filter processing for the second environment change area is performed based on the second similarity weight. In this way, the technical problems in the related art, which may result in the insufficient smoothness of the temporal consistency filtering and the great jitter of depth data in a time domain, are solved effectively. By dividing the depth map into two environment change areas and choosing different strategies to perform the smoothing processing in the different areas, the depth value of the depth smoothly changing area in the time dimension becomes effectively smoother and the depth rapidly changing area maintains the original high dynamics.

To implement the above embodiments, the present disclosure further provides a depth data filtering apparatus. As illustrated in FIG. 5, the depth data filtering apparatus includes an obtaining module 501, a first marking module 502, a second marking module 503, a first generating module 504, a second generating module 505 and a processing module 506.

The obtaining module 501 is configured to obtain, for each pixel, a depth difference value between two consecutive frames of depth maps.

The first marking module 502 is configured to mark an area formed by respective pixels, for which the depth difference value is smaller than a predetermined absolute depth deviation, as a first environment change area. The predetermined absolute depth deviation is determined based on a depth value of each pixel in a previous frame of depth map and a predetermined error percentage.

The second marking module 503 is configured to mark an area formed by respective pixels, for which the depth difference value is greater than or equal to the predetermined absolute depth deviation, as a second environment change area.

The first generating module 504 is configured to generate a first similarity weight corresponding to each pixel in the first environment change area based on the depth difference value, an enlarged predetermined original smoothing coefficient, and a pixel depth deviation value of a current frame.

The second generating module 505 is configured to generate a second similarity weight corresponding to each pixel in the second environment change area based on the depth difference value, a reduced predetermined original smoothing coefficient, and the pixel depth deviation value of a current frame.

The processing module 506 is configured to perform filter processing for the first environment change area based on the first similarity weight and perform filter processing for the second environment change area based on the second similarity weight.

Figure 6:
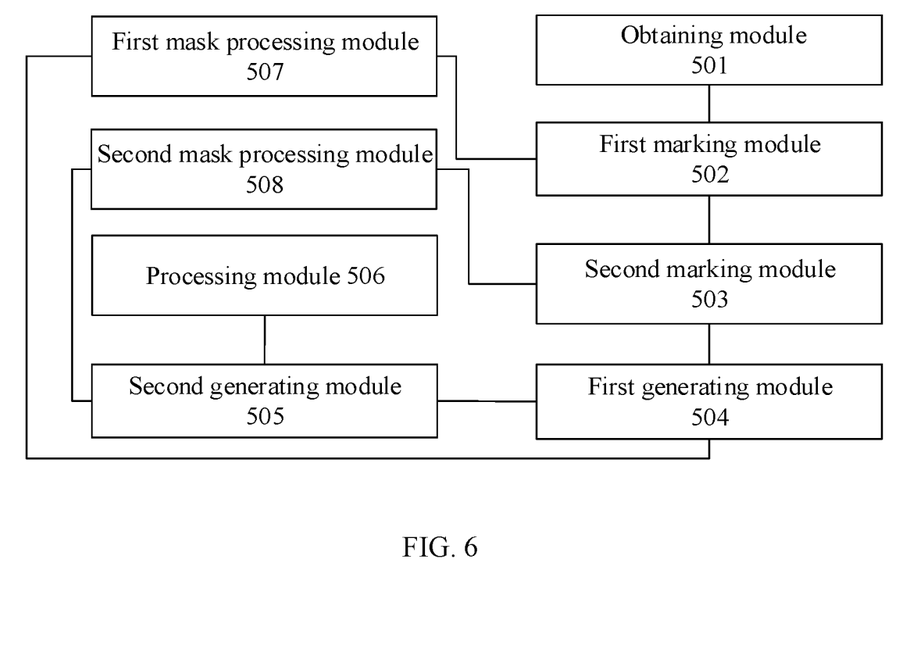
FIG. 6 is a schematic structural diagram of another depth data filtering apparatus according to an embodiment of the present disclosure.

In an embodiment of the present disclosure, on the basis of FIG. 5, the apparatus further includes a first mask processing module 507 and a second mask processing module 508, as illustrated in FIG. 6.

The first mask processing module 507 is configured to mark the first environment change area with a first area mask.

The second mask processing module 508 is configured to mark the second environment change area with a second area mask.

In an embodiment of the present disclosure, the processing module 506 is specifically configured to: obtain a first original depth value of the previous frame and a first original depth value of the current frame corresponding to each pixel in the first environment change area in a predetermined coordinate system, and obtain a first current frame depth value corresponding to each pixel in the first environment change area by summing-up a product of the first similarity weight and the first original depth value of the previous frame and a product of a third similarity weight and the first original depth value of the current frame, where a sum of the first similarity weight and the third similarity weight is equal to 1.

In an embodiment of the present disclosure, the processing module 506 is specifically configured to obtain: a second original depth value of the previous frame and a second original depth value of the current frame corresponding to each pixel in the second environment change area in a predetermined coordinate system, and obtain a second current frame depth value corresponding to each pixel in the second environment change area by summing-up a product of the second similarity weight and the second original depth value of the previous frame and a product of a fourth similarity weight and the second original depth value of the current frame, where a sum of the second similarity weight and the fourth similarity weight is equal to 1.

In an embodiment of the present disclosure, the similarity weight is generated based on the depth difference value for each pixel, the predetermined original smoothing coefficient, and the pixel depth deviation value of the current frame by applying a predetermined formula.

In an embodiment of the present disclosure, the predetermined formula is $$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

It should be noted that the foregoing explanation and description focused on the embodiments of the depth data filtering method also apply to the depth data filtering apparatus of the embodiments of the present disclosure, whose implementation details and the technical effects are not repeated herein.

To sum up, in the depth data filtering apparatus according to the embodiments of the present disclosure, for each pixel, the depth difference value between two consecutive frames of depth maps is obtained; the area formed by respective pixels, for which the depth difference value is smaller than the predetermined absolute depth deviation is marked as the first environment change area, where the predetermined absolute depth deviation is determined based on the depth value of each pixel in a previous frame of depth map and the predetermined error percentage; the area formed by respective pixels, for which the depth difference value is greater than or equal to the predetermined absolute depth deviation is marked as the second environment change area; the first similarity weight corresponding to each pixel in the first environment change area is generated based on the depth difference value, the enlarged predetermined original smoothing coefficient, and the pixel depth deviation value of a current frame; the second similarity weight corresponding to each pixel in the second environment change area is generated based on the depth difference value, the reduced predetermined original smoothing coefficient, and the pixel depth deviation value of the current frame; and the filter processing for the first environment change area is performed based on the first similarity weight, and the filter processing for the second environment change area is performed based on the second similarity weight. In this way, the technical problems in the related art, which may result in the insufficient smoothness of the temporal consistency filtering and the great jitter of depth data in a time domain, are solved effectively. By dividing the depth map into two environment change areas and choosing different strategies to perform the smoothing processing in the different areas, the depth value of the depth smoothly changing area in the time dimension becomes effectively smoother and the depth rapidly changing area maintains the original high dynamics.

To implement the above embodiments, the present disclosure further provides an electronic device, which includes an image sensor, a memory, a processor and a computer program stored in the memory and executable on the processor. The processor, when executes the computer program, implements the depth data filtering method as described in the above embodiments.

To implement the above embodiments, the present disclosure further provides a non-transitory computer-readable storage medium, which includes a computer program stored thereon. The program, when executed by a processor, implements the depth data filtering method as described in the above method embodiments.

Reference throughout this specification to "an embodiment," "some embodiments," "an example," "a specific example", or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, without contradictory, those skilled in the art could combine different embodiments or examples, or different characteristics in embodiments or examples described in the present disclosure.

Moreover, terms such as "first" and "second" are only used for description and cannot be considered as indicating or implying relative importance or indicating or implying the number of the indicated technical features. Thus, the features defined with "first" and "second" may comprise or imply at least one of these features. In the description of the present disclosure, "a plurality of" means two or more than two, for example, two, three, etc., unless specified otherwise.

Any process or method described in a flow chart or described herein in other ways may be understood to include one or more modules, segments or portions of codes of executable instructions for achieving specific logical functions or steps in the process, and the scope of the preferred embodiments of the present disclosure includes other implementations, in which the order of execution may differ from that which is depicted or discussed, including that the involved functions are executed in substantially simultaneous manner or in an reverse order, which should be understood by those skilled in the art.

The logic and/or steps illustrated in the flow charts or described in other manners herein, for example, can be considered as a sequenced list of executable instructions for realizing logic functions, and may be embodied in any computer-readable medium to be used by instruction execution systems, devices, or equipment (such as computer-based systems, systems including processors, or other systems that can fetch and execute instructions from instruction execution systems, devices, or equipment), or to be used in combination with the instruction execution systems, devices, and equipment. In the specification, the "computer-readable medium" may be any device adaptive for including, storing, communicating, propagating, or transferring programs to be used by or in combination with the instruction execution systems, devices, or equipment. Specific examples of the computer-readable medium include, but are not limited to, an electronic connection (an electronic device) with one or more wirings, a portable computer enclosure (a magnetic device), a random access memory (RAM), a read-only memory (ROM), an erasable programmable read-only memory (EPROM or a flash memory), an optical fiber device, and a portable compact disk read-only memory (CDROM). In addition, the computer-readable medium may even be paper or other appropriate medium capable of printing programs thereon, as the programs may be obtained in an electric manner by, for example, optically scanning the paper or the other appropriate medium and then editing, decrypting or processing with other appropriate methods when necessary, and then the programs may be stored on the computer memories.

It should be understood that each part of the present disclosure may be implemented by hardware, software, firmware, or combinations thereof. In the above embodiments, multiple steps or methods may be implemented by firmware or software stored in the memory and executed by the appropriate instruction execution system. For example, if it is implemented by the hardware as in another embodiment, the steps or methods may be implemented by one or a combination of the following techniques known in the art: a discrete logic circuit having a logic gate circuit for implementing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be implemented by commanding the related hardware with programs, the programs may be stored in a non-transitory computer-readable storage medium, and the programs, when being executed, implement one or a combination of the steps in the method embodiments of the present disclosure.

In addition, the respective function units of the embodiments of the present disclosure may be integrated in one processing module, or these units may be physically separate, or two or more units are integrated in one module. The above-mentioned integrated module may be implemented in a form of hardware or software functional module. When the integrated module is implemented in the form of software functional module and is sold or used as an independent product, it may be stored in a non-transitory computer-readable storage medium.

The storage medium mentioned above may be a read-only memory, a magnetic disk or an optical disk, etc. Although the embodiments of the present disclosure have been shown and described above, it should be understood that the above-described embodiments are illustrative and should not to be construed as limiting the scope of the present disclosure. Within the scope of the present disclosure, those skilled in the art can make variations, modifications, equivalents, and improvements to the above-described embodiments.

What is claimed is:

1. A depth data filtering method, comprising:
   obtaining, for each pixel, a depth difference value between two consecutive frames of depth maps;
   marking an area formed by pixels as a first environment change area, the depth difference value of the pixels being smaller than a predetermined absolute depth deviation;
   marking an area formed by pixels as a second environment change area, the depth difference value of the pixels being greater than or equal to the predetermined absolute depth deviation;
   generating a first similarity weight corresponding to each pixel in the first environment change area based on the depth difference value, an enlarged predetermined original smoothing coefficient, and a pixel depth deviation value of a current frame;
   generating a second similarity weight corresponding to each pixel in the second environment change area based on the depth difference value, a reduced predetermined original smoothing coefficient, and the pixel depth deviation value of the current frame; and
   filtering the first environment change area based on the first similarity weight and filtering the second environment change area based on the second similarity weight.

2. The method according to claim 1, further comprising:
   marking the first environment change area with a first area mask.

3. The method according to claim 1, further comprising:
   marking the second environment change area with a second area mask.

4. The method according to claim 1, wherein said filtering the first environment change area based on the first similarity weight comprises:
   obtaining a first original depth value of the previous frame and a first original depth value of the current frame corresponding to each pixel in the first environment change area in a predetermined coordinate system; and
   obtaining a first current frame depth value corresponding to each pixel in the first environment change area by summing-up a product of the first similarity weight and the first original depth value of the previous frame and a product of a third similarity weight and the first original depth value of the current frame, wherein a sum of the first similarity weight and the third similarity weight is equal to 1.

5. The method according to claim 4, wherein a similarity weight is generated based on the depth difference value for each pixel, a predetermined original smoothing coefficient, and the pixel depth deviation value of the current frame by applying the following predetermined formula:

$$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

6. The method according to claim 1, wherein said filtering the second environment change area based on the second similarity weight comprises:
obtaining a second original depth value of the previous frame and a second original depth value of the current frame corresponding to each pixel in the second environment change area in a predetermined coordinate system; and
obtaining a second current frame depth value corresponding to each pixel in the second environment change area by summing-up a product of the second similarity weight and the second original depth value of the previous frame and a product of a fourth similarity weight and the second original depth value of the current frame, wherein a sum of the second similarity weight and the fourth similarity weight is equal to 1.

7. The method according to claim 5, wherein a similarity weight is generated based on the depth difference value for each pixel, a predetermined original smoothing coefficient, and the pixel depth deviation value of the current frame by applying the following predetermined formula:

$$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

8. An electronic device, comprising an image sensor, a memory, a processor, and a computer program stored in the memory and executable on the processor, wherein the image sensor is electrically connected to the processor, and the program, when executed by the processor, implements a depth data filtering method, comprising:
obtaining, for each pixel, a depth difference value between two consecutive frames of depth maps;
marking an area formed by respective pixels as a first environment change area, the depth difference value of the pixels being smaller than a predetermined absolute depth deviation;
marking an area formed by pixels as a second environment change area, the depth difference value of the pixels being greater than or equal to the predetermined absolute depth deviation;
generating a first similarity weight corresponding to each pixel in the first environment change area based on the depth difference value, an enlarged predetermined original smoothing coefficient, and a pixel depth deviation value of a current frame;
generating a second similarity weight corresponding to each pixel in the second environment change area based on the depth difference value, a reduced predetermined original smoothing coefficient, and the pixel depth deviation value of the current frame; and
filtering the first environment change area based on the first similarity weight and filtering the second environment change area based on the second similarity weight.

9. The electronic device according to claim 8, wherein the program, when executed by the processor, further implements:
marking the first environment change area with a first area mask.

10. The electronic device according to claim 8, wherein the program, when executed by the processor, further implements:
marking the second environment change area with a second area mask.

11. The electronic device according to claim 8, wherein the program, when executed by the processor, implements:
obtaining a first original depth value of the previous frame and a first original depth value of the current frame corresponding to each pixel in the first environment change area in a predetermined coordinate system; and
obtaining a first current frame depth value corresponding to each pixel in the first environment change area by summing-up a product of the first similarity weight and the first original depth value of the previous frame and a product of a third similarity weight and the first original depth value of the current frame, wherein a sum of the first similarity weight and the third similarity weight is equal to 1.

12. The electronic device according to claim 11, wherein the program, when executed by the processor, implements:
generating a similarity weight based on the depth difference value for each pixel, a predetermined original smoothing coefficient, and the pixel depth deviation value of the current frame by applying the following predetermined formula:

$$w1 = s * \exp\left(-\frac{diff^2}{2\sigma^2}\right),$$

where s represents the predetermined original smoothing coefficient, diff represents the depth difference value, and σ represents the pixel depth deviation value of the current frame.

13. The electronic device according to claim 8, wherein the program, when executed by the processor, implements:
obtaining a second original depth value of the previous frame and a second original depth value of the current frame corresponding to each pixel in the second environment change area in a predetermined coordinate system; and
obtaining a second current frame depth value corresponding to each pixel in the second environment change area by summing-up a product of the second similarity weight and the second original depth value of the previous frame and a product of a fourth similarity weight and the second original depth value of the current frame, wherein a sum of the second similarity weight and the fourth similarity weight is equal to 1.

14. The electronic device according to claim 13, wherein the program, when executed by the processor, implements:
generating a similarity weight based on the depth difference value for each pixel, a predetermined original smoothing coefficient, and the pixel depth deviation value of the current frame by applying the following predetermined formula:

$$w1 = s * \exp\left(-\frac{\mathit{diff}^2}{2\sigma^2}\right),$$

where s represents the predetermined original smoothing coefficient, diff represents the depth difference value, and σ represents the pixel depth deviation value of the current frame.

15. A non-transitory computer-readable storage medium, comprising a computer program stored thereon, wherein the computer program, when executed by a processor, implements a depth data filtering method comprising:
- obtaining, for each pixel, a depth difference value between two consecutive frames of depth maps for each pixel;
- marking an area formed by pixels as a first environment change area, the depth difference value of the pixels being smaller than a predetermined absolute depth deviation;
- marking an area formed by respective pixels as a second environment change area, the depth difference value of the pixels being greater than or equal to the predetermined absolute depth deviation;
- generating a first similarity weight corresponding to each pixel in the first environment change area based on the depth difference value, an enlarged predetermined original smoothing coefficient, and a pixel depth deviation value of a current frame;
- generating a second similarity weight corresponding to each pixel in the second environment change area based on the depth difference value, a reduced predetermined original smoothing coefficient, and the pixel depth deviation value of the current frame; and
- filtering the first environment change area based on the first similarity weight and filtering the second environment change area based on the second similarity weight.

16. The non-transitory computer-readable storage medium according to claim 15, wherein the computer program, when executed by the processor, further implements:
- marking the first environment change area with a first area mask.

17. The non-transitory computer-readable storage medium according to claim 15, wherein the computer program, when executed by the processor, further implements:
- marking the second environment change area with a second area mask.

18. The non-transitory computer-readable storage medium according to claim 15, wherein the computer program, when executed by the processor, implements:
- obtaining a first original depth value of the previous frame and a first original depth value of the current frame corresponding to each pixel in the first environment change area in a predetermined coordinate system; and
- obtaining a first current frame depth value corresponding to each pixel in the first environment change area by summing-up a product of the first similarity weight and the first original depth value of the previous frame and a product of a third similarity weight and the first original depth value of the current frame, wherein a sum of the first similarity weight and the third similarity weight is equal to 1.

19. The non-transitory computer-readable storage medium according to claim 15, wherein the computer program, when executed by the processor, implements:
- obtaining a second original depth value of the previous frame and a second original depth value of the current frame corresponding to each pixel in the second environment change area in a predetermined coordinate system;
- obtaining a second current frame depth value corresponding to each pixel in the second environment change area by summing-up a product of the second similarity weight and the second original depth value of the previous frame and a product of a fourth similarity weight and the second original depth value of the current frame, wherein a sum of the second similarity weight and the fourth similarity weight is equal to 1.

20. The non-transitory computer-readable storage medium according to claim 18, wherein the computer program, when executed by the processor, implements:
- generating a similarity weight based on the depth difference value for each pixel, a predetermined original smoothing coefficient, and the pixel depth deviation value of the current frame by applying the following predetermined formula:

$$w1 = s * \exp\left(-\frac{\mathit{diff}^2}{2\sigma^2}\right),$$

where s represents the predetermined original smoothing coefficient, cuff represents the depth difference value, and σ represents the pixel depth deviation value of the current frame.

* * * * *